(12) United States Patent
Wang et al.

(10) Patent No.: US 8,444,103 B2
(45) Date of Patent: May 21, 2013

(54) FOLDABLE SUPPORT FRAME ASSEMBLY WITH SCISSOR-LINKAGES

(76) Inventors: Cheng-Chung Wang, Taipei (TW); Kenneth Wang, Taipei (TW)

( * ) Notice: Subject to any disclaimer, the term of this patent is extended or adjusted under 35 U.S.C. 154(b) by 457 days.

(21) Appl. No.: 12/617,503

(22) Filed: Nov. 12, 2009

(65) Prior Publication Data

US 2010/0181459 A1  Jul. 22, 2010

(30) Foreign Application Priority Data

Jan. 21, 2009  (TW) .............................. 98102234 A

(51) Int. Cl.
*F16M 11/38* (2006.01)
(52) U.S. Cl.
USPC ................................... 248/436; 5/114; 5/174
(58) Field of Classification Search
USPC ................... 211/85.24, 105, 200–202; 5/174, 5/176.1, 177, 182; 248/277.1, 370, 421
See application file for complete search history.

(56) References Cited

U.S. PATENT DOCUMENTS

| | | | |
|---|---|---|---|
| 6,581,223 B1* | 6/2003 | Wang | 5/174 |
| 7,770,246 B2* | 8/2010 | Chen | 5/111 |
| 8,074,669 B2* | 12/2011 | Collins et al. | 135/145 |
| 2003/0019033 A1* | 1/2003 | Choi | 5/114 |
| 2004/0000009 A1* | 1/2004 | Choi | 5/174 |
| 2004/0074858 A1* | 4/2004 | Thuma et al. | 211/202 |
| 2008/0196162 A1* | 8/2008 | Yul et al. | 5/97 |

* cited by examiner

*Primary Examiner* — Gwendolyn Baxter

(57) ABSTRACT

A foldable support frame assembly includes a row of support units arranged along a first direction. Each of the support units includes two support frames. Each of the support frames includes two parallel braces, a top rail connected fixedly between upper end portions of the linking rods, and a bottom rail connected fixedly between lower end portions of the braces. The braces of each of the support units constitute two first scissor-linkages spaced apart from each other along a second direction perpendicular to the first direction. The foldable support frame assembly further includes a plurality of second scissor-linkages arranged alternately with the support units along the first direction, and a positioning mechanism for maintaining each of the first and second scissor-linkages in an unfolded state.

12 Claims, 12 Drawing Sheets

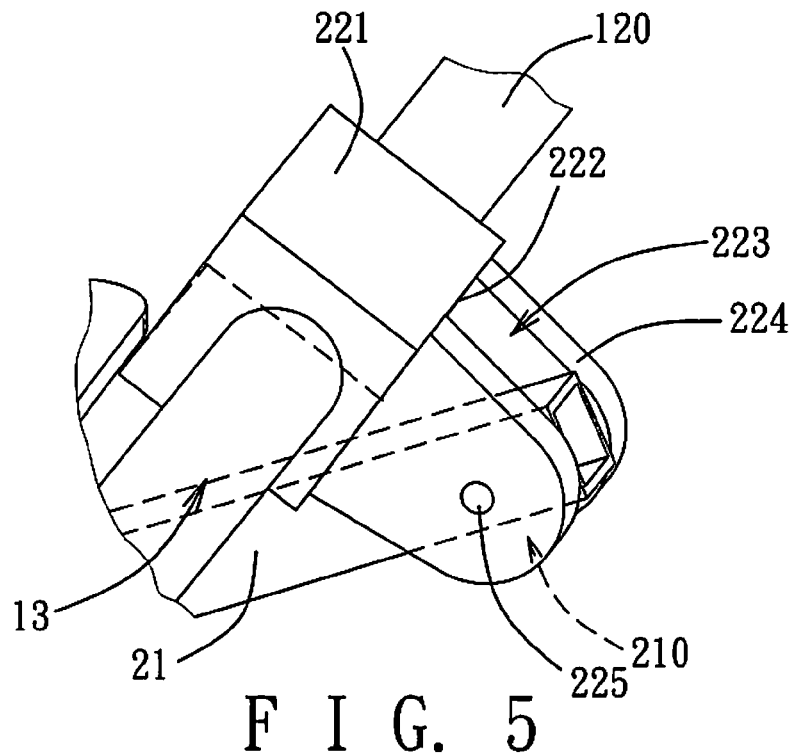
F I G. 5
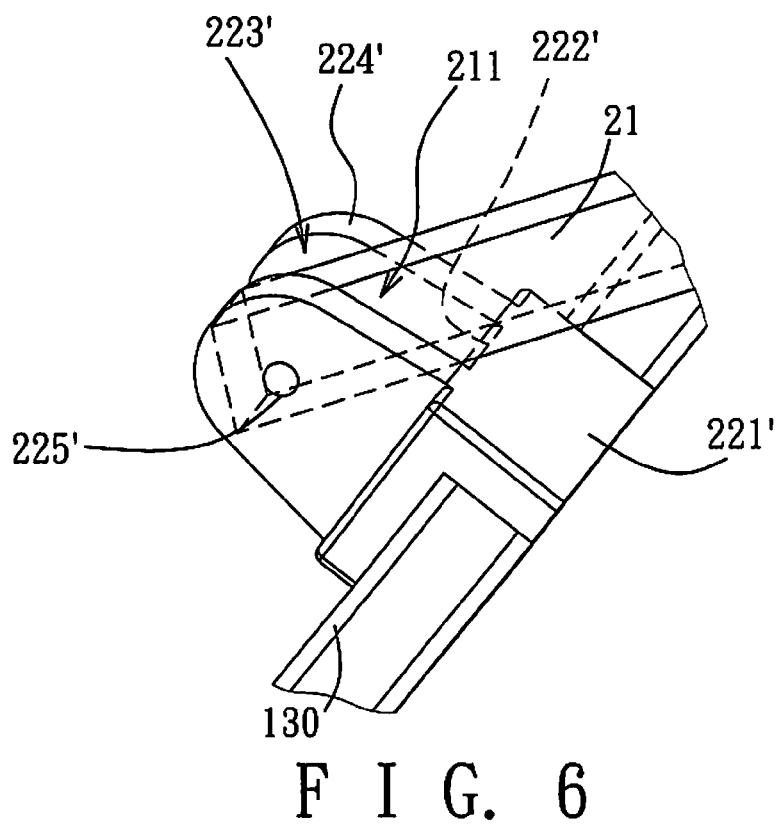
F I G. 6

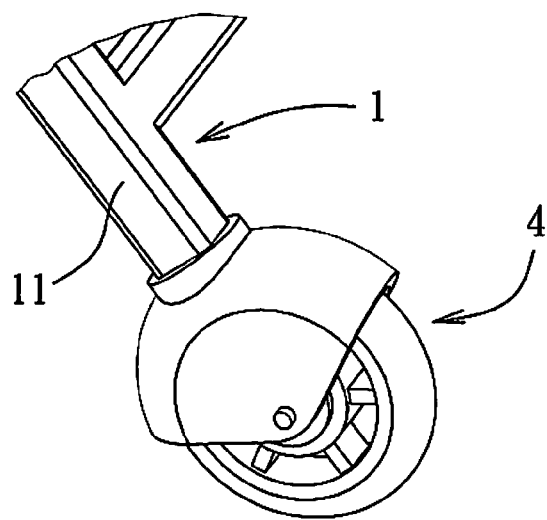
F I G. 15
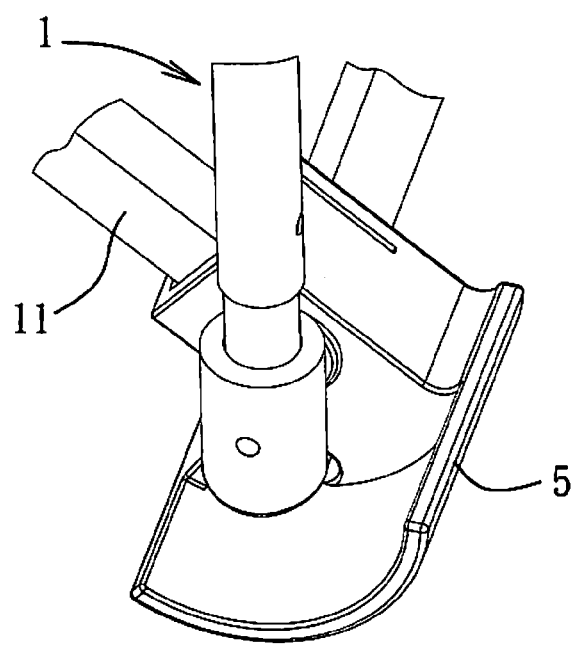
F I G. 16

US 8,444,103 B2

FOLDABLE SUPPORT FRAME ASSEMBLY WITH SCISSOR-LINKAGES

CROSS-REFERENCE TO RELATED APPLICATION

This application claims priority of Taiwanese Application No. 098102234, filed on Jan. 21, 2009.

BACKGROUND OF THE INVENTION

1. Field of the Invention

This invention relates to a support frame, and more particularly to a foldable support frame assembly for supporting an article, such as an inflatable bed mattress.

2. Description of the Related Art

In Taiwanese Utility Model No. 212460, the applicants disclose an inflatable bed that includes a bedstead frame assembly convertible between unfolded and folded states. However, the bedstead frame assembly has a somewhat complicated structure.

SUMMARY OF THE INVENTION

The object of this invention is to provide a foldable support frame assembly that can be used to support an article, such as an inflatable bed mattress, and that has a simple structure.

According to this invention, a foldable support frame assembly includes a row of support units arranged along a first direction. Each of the support units includes two support frames. Each of the support frames includes two parallel braces, a top rail connected fixedly between upper end portions of the linking rods, and a bottom rail connected fixedly between lower end portions of the braces. The braces of each of the support units constitute two first scissor-linkages spaced apart from each other along a second direction perpendicular to the first direction. The foldable support frame assembly further includes a plurality of second scissor-linkages arranged alternately with the support units along the first direction, and a positioning mechanism for maintaining each of the first and second scissor-linkages in an unfolded state.

BRIEF DESCRIPTION OF THE DRAWINGS

These and other features and advantages of this invention will become apparent in the following detailed description of the preferred embodiments of this invention, with reference to the accompanying drawings, in which:

FIGS. 5 and 6 are views similar respectively to FIGS. 3 and 4 but illustrating how the first preferred embodiment is maintained in the unfolded state;

FIG. 15 a schematic perspective view illustrating how a brace of the first scissor-linkage is provided with a caster;

FIG. 16 is a schematic perspective view illustrating how the brace of the first scissor-linkage is provided with a curved sliding plate.

DETAILED DESCRIPTION OF THE PREFERRED EMBODIMENTS

Figure 1:
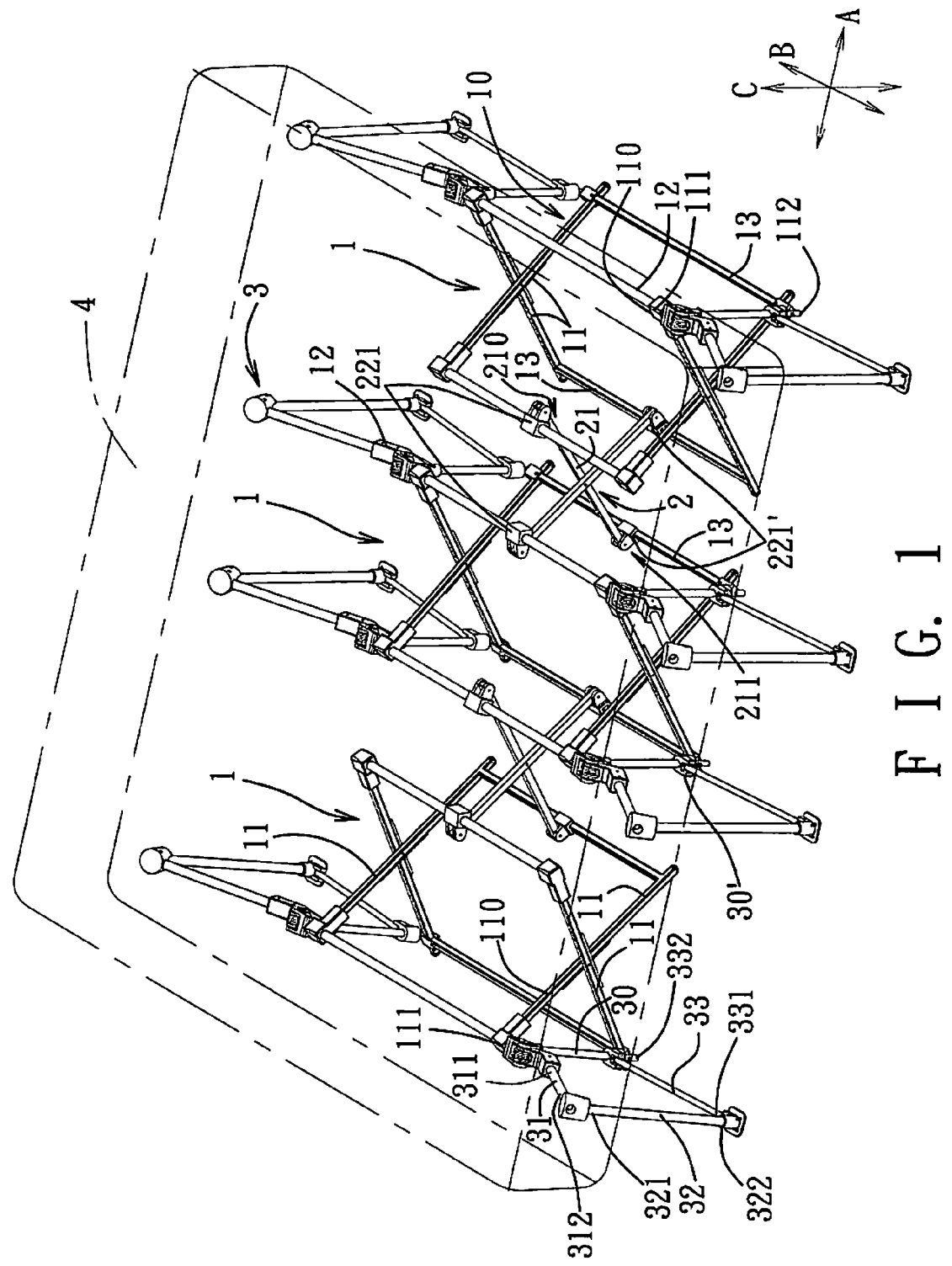
FIG. 1 is a perspective view of the first preferred embodiment of a foldable support frame assembly according to this invention in an unfolded state.

Before the present invention is described in greater detail in connection with the preferred embodiments, it should be noted that similar elements and structures are designated by like reference numerals throughout the entire disclosure.

Figure 2:
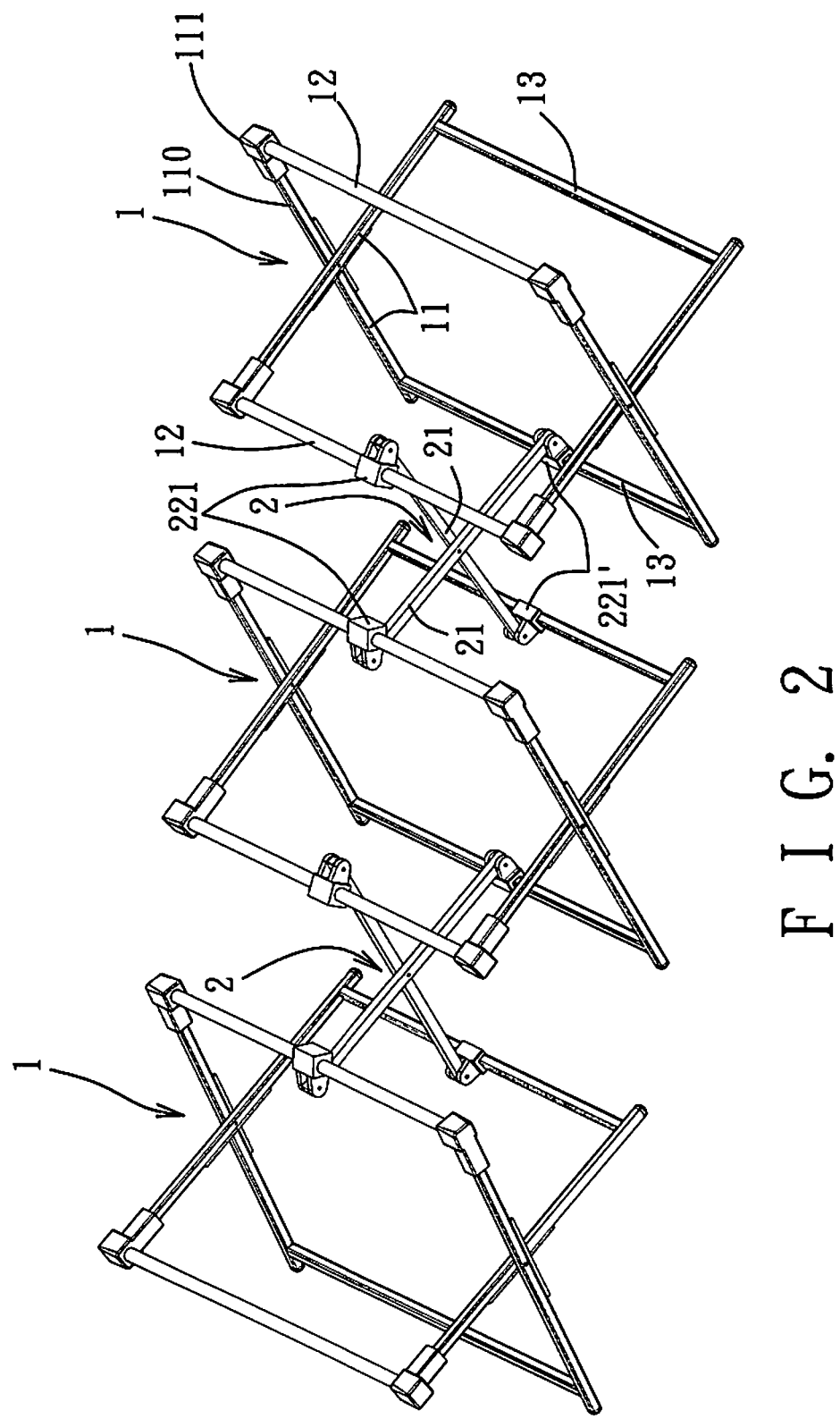
FIG. 2 is a fragmentary perspective view of the first preferred embodiment in the unfolded state, a plurality of expansion units being removed for illustrating first and second scissor-linkages.

Referring to FIGS. 1 and 2, the first preferred embodiment of a foldable support frame assembly according to this invention is used to support an article 4, and includes three support units 1 arranged along a first direction (A) in a row. In this embodiment, the foldable support frame assembly is configured as a bedstead frame, and the article is configured as an inflatable bed mattress including an impermeable air bladder formed with a top sheet, a bottom sheet, and a surrounding sheet. Each of the support units 1 includes two support frames 10. Each of the support frames 10 is rectangular, and includes two parallel braces 11, a top rail 12 connected fixedly between upper portions of the braces 11, and a bottom rail 13 connected fixedly between lower portions 112 of the braces 11. In this embodiment, each of the braces 11 has a rod body 110 and a sleeve member 111 that is sleeved fixedly on an upper end of the rod body 110 and a corresponding end of the corresponding top rail 12 and that constitutes the upper end portion of the corresponding brace 11.

The braces 11 of the support frames 10 of each of the support units 1 are connected respectively and pivotally to the braces 11 of the other of the support frames 10 of the corresponding support unit 1 to constitute two first scissor-linkages. The two first scissor-linkages are spaced apart from each other along a second direction (B) perpendicular to the first direction (A). Each of the first scissor-linkages is convertible between an unfolded state shown in FIG. 1 and a folded state shown in FIG. 7.

The foldable support frame assembly further includes two second scissor-linkages 2 arranged alternately with the support units 1 along the first direction (A). Each of the second scissor-linkages 2 includes two linking rods 21 that are connected pivotally to each other. Each of the linking rods 21 has an upper end 210 connected pivotally to the corresponding top rail 12, and a lower end 211 connected pivotally to the corresponding bottom rail 13. Each of the second scissor-linkages 2 is also convertible between an unfolded state shown in FIG. 1 and a folded state shown in FIG. 7. When each of the first scissor-linkages and the second scissor-linkages 2 is in the unfolded state, the article 4 can be supported stably on the support units 1. Alternatively, two or more interconnected second scissor-linkages 2 may be disposed between any adjacent pair of support units 1 to provide enhanced support.

The foldable support frame assembly further includes a plurality of expansion units 3, each of which is disposed on the corresponding support unit 1. Each of the expansion units 3 includes a telescopic rod 30, a sliding member 30', a first link 31, a second link 32, and a third link 33. One of the expansion units 3 will be described in the succeeding paragraph.

Figure 7:
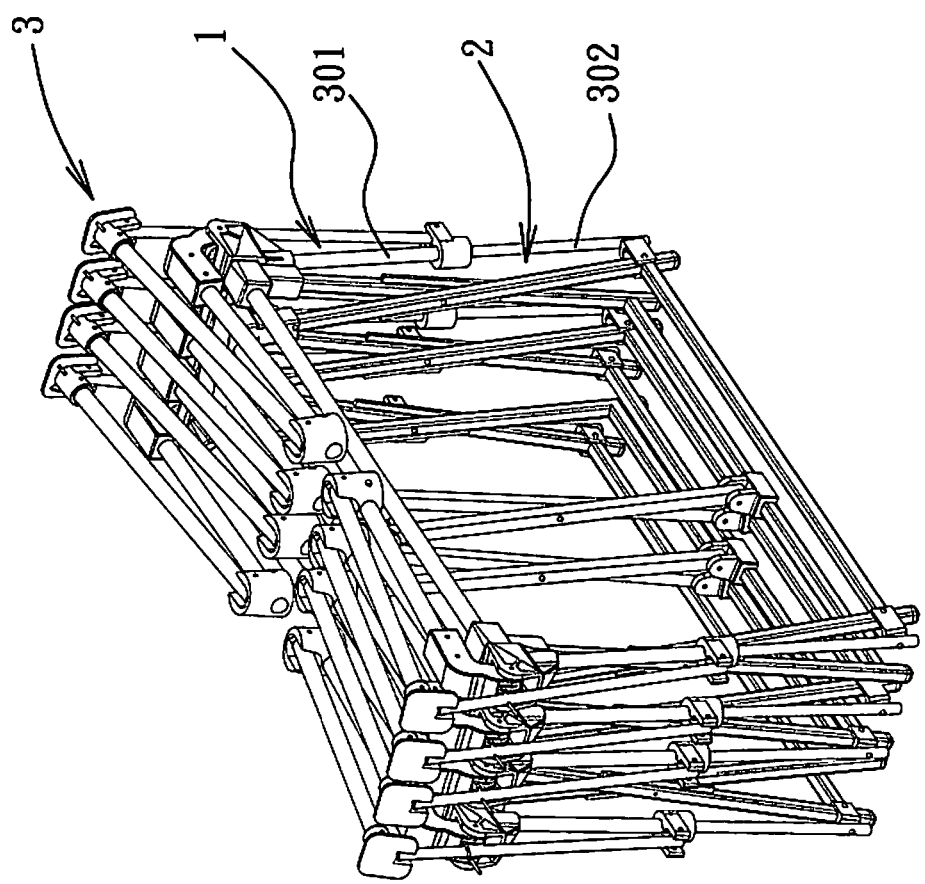
FIG. 7 is a perspective view of the first preferred embodiment in a folded state.

The telescopic rod 30 extends along a third direction (C) perpendicular to the first and second directions (A, B), and has an upper rod portion 301 (see FIG. 7) connected pivotally to an end of the corresponding top rail 12, and a lower rod portion 302 (see FIG. 7) connected pivotally to an end of the corresponding bottom rail 13 and inserted into and connected telescopically to the upper rod portion 301. The sliding member 30' is sleeved movably on the telescopic rod 30. The first link 31 has a first end 311 connected pivotally to an upper end of the telescopic rod 30, and a second end 312 opposite to the first end 311. The second link 32 has a first end 321 connected pivotally to the second end 312 of the first link 31, and a second end 322 opposite to the first end 321. The third link 33 has a first end 331 connected pivotally to the second end 322 of the second link 32, and a second end 332 opposite to the first end 331 and connected pivotally to the sliding member 30'. When each of the first scissor-linkages and the second scissor-linkages 2 is in the unfolded state, the second end 322 of the second link 32 is movable to a position coplanar with the lower ends of the braces 11 of the support units 1, as shown in FIG. 1. When each of the first scissor-linkages and the second scissor-linkages 2 is in the folded state, the second end 312 of the first link 31 is pivotable to abut against the corresponding top rail 12, as shown in FIG. 7.

Figure 3:
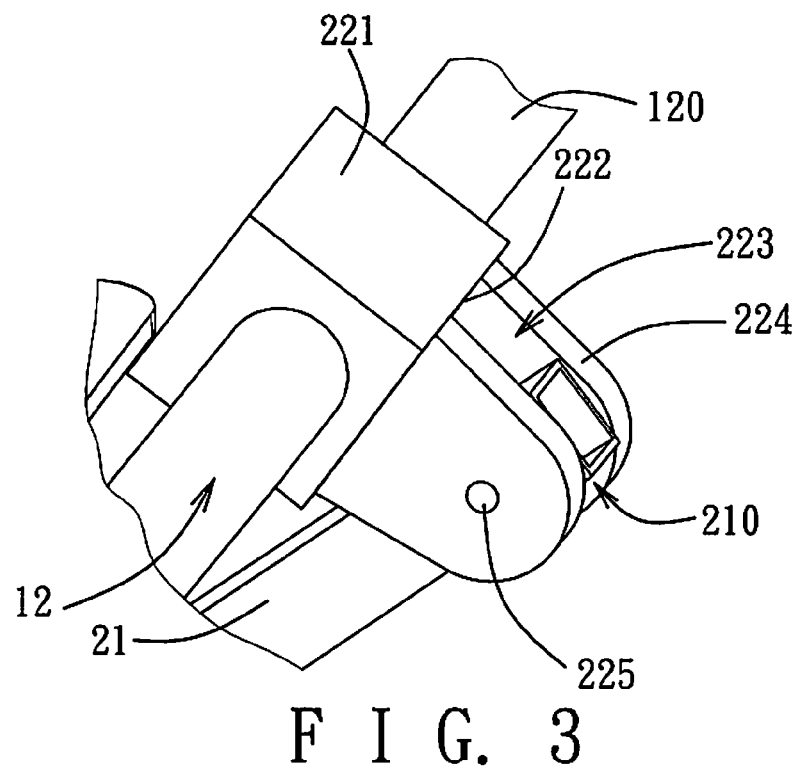
FIG. 3 is a schematic perspective view illustrating the connection relationship between a linking rod of one of the second scissor-linkages and a top rail.

With further reference to FIG. 3, each of the top rails 12 includes a top rail body 120 having a circular cross-section, a top mounting block 221 sleeved on the top rail body 120 in a tight fitting manner and having an abutment face 222 abutting against the upper end 210 of the corresponding linking rod 21 when each of the first scissor-linkages and the second scissor-linkages 2 is in the unfolded state (see FIG. 5), two aligned top lugs 224 extending integrally from the top mounting block 221, and a pivot pin 225 extending through the top lugs 224 and the upper end 210 of the corresponding linking rod 21 such that the upper end 210 of the corresponding linking rod 21 is disposed within a space 223 defined between the top lugs 224.

Figure 4:
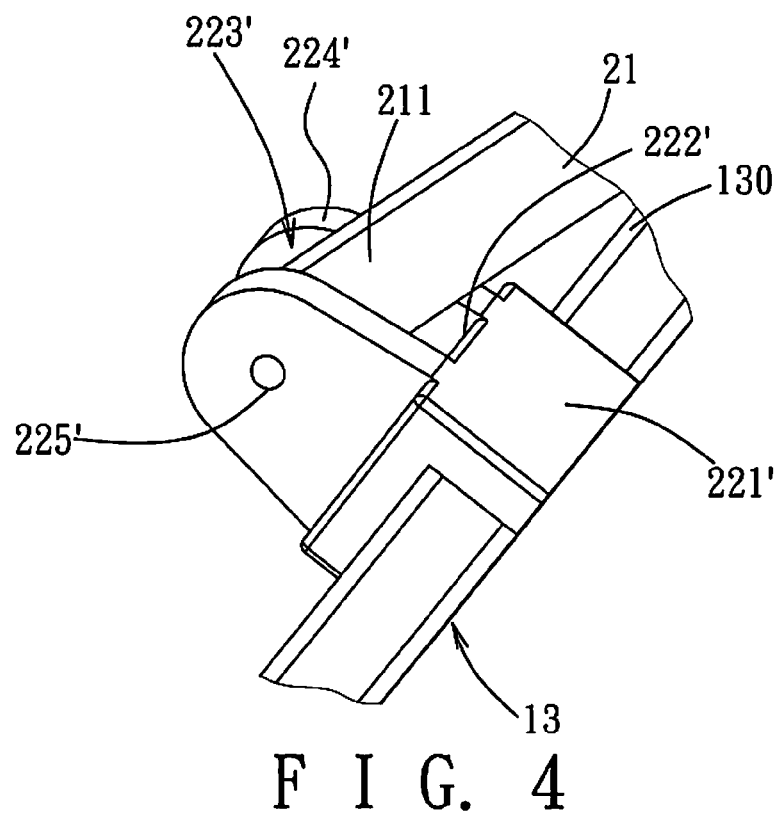
FIG. 4 is a schematic perspective view illustrating the connection relationship between a linking rod of one of the second scissor-linkages and a bottom rail.

With further reference to FIG. 4, each of the bottom rails 13 includes a bottom rail body 130 having a generally rectangular cross-section, a bottom mounting block 221' sleeved on the bottom rail body 130 in a tight fitting manner and having an abutment face 222' abutting against the lower end 211 of the corresponding linking rod 21 when each of the first scissor-linkages and the second scissor-linkages 2 is in the unfolded state (see FIG. 6), two aligned bottom lugs 224' extending integrally from the bottom mounting block 221', and a pivot pin 225' extending through the bottom lugs 224' and the lower end 211 of the corresponding linking rod 21 such that the lower end 211 of the corresponding linking rod 21 is disposed within a space 223' defined between the bottom lugs 224'. The abutment faces 222, 222' of the top and bottom mounting blocks 221, 221' of the top and bottom rails 12, 13 of the support frames 10 of the support units 1 constitute a positioning mechanism for maintaining each of the first scissor-linkages and the second scissor-linkages 2 in the unfolded state.

Figure 8:
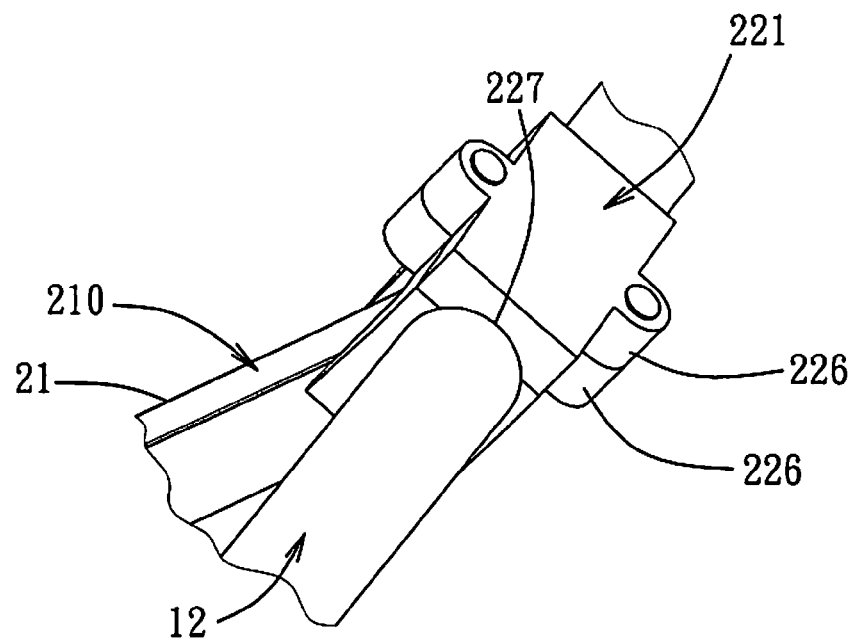
FIG. 8 shows a modified top mounting block.
Figure 9:
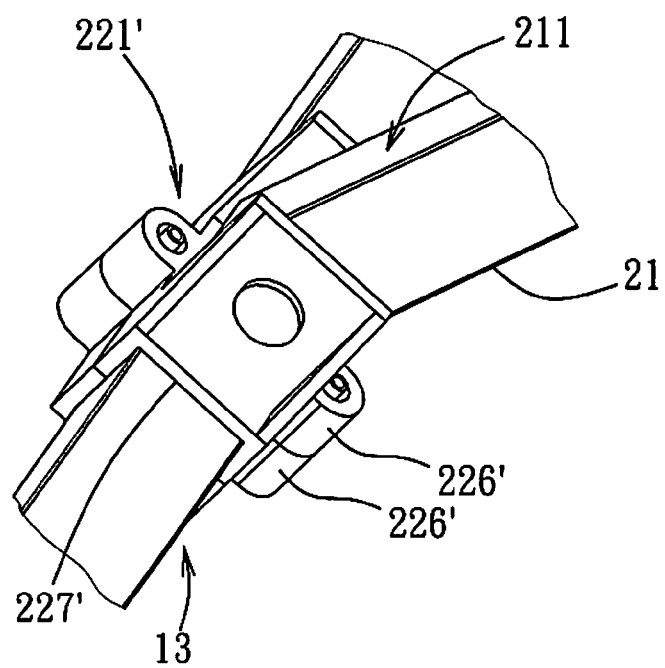
FIG. 9 shows a modified bottom mounting block.

In this embodiment, each of the top and bottom mounting blocks 221, 221' is unitary. Alternatively, with further reference to FIGS. 8 and 9, each of the top and bottom mounting blocks 221 may include two halves 226, 226' that are connected threadedly to each other. The halves 226 of the top mounting block 221 define a circular hole 227 therebetween. The halves 226' of the bottom mounting block 221' define a rectangular hole 227' therebetween.

Figure 10:
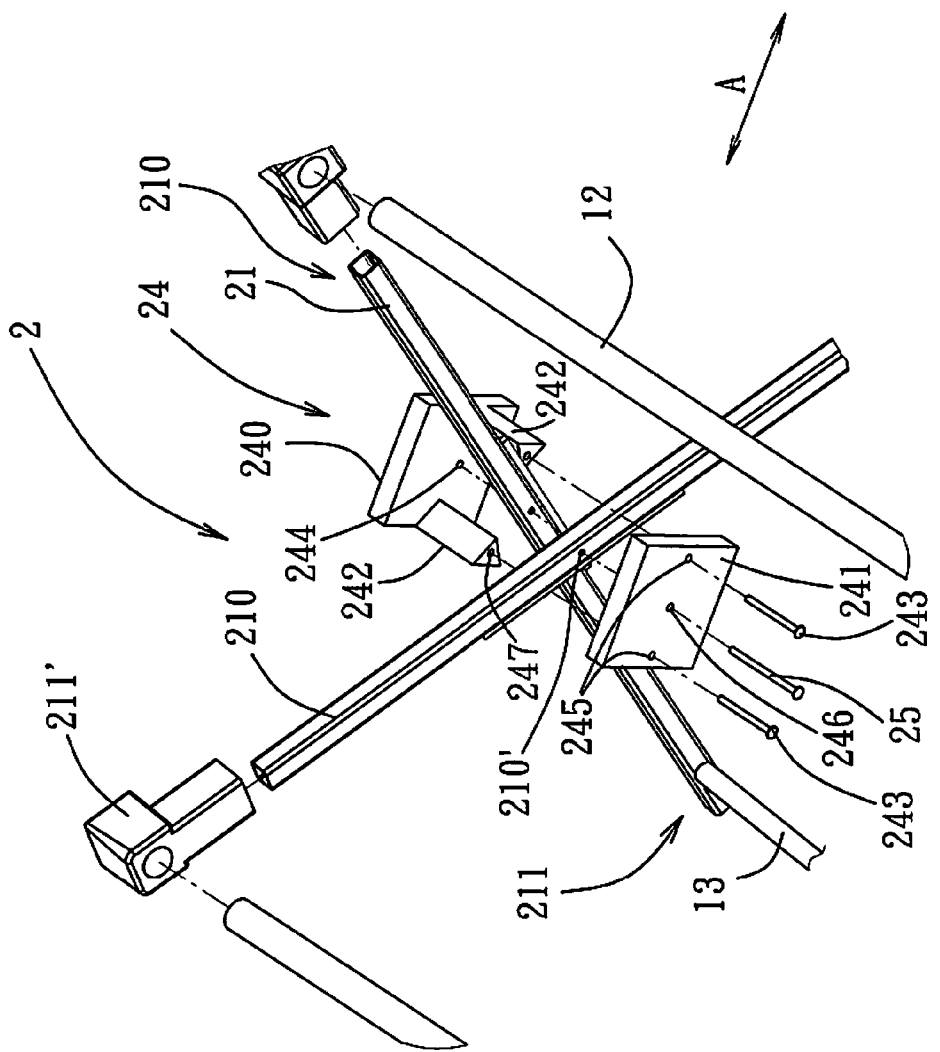
FIG. 10 is an exploded perspective view of a second scissor-linkage and a positioning unit of the second preferred embodiment of a foldable support frame assembly according to this invention.

FIG. 10 shows a second scissor-linkage 2 and a positioning unit 24 of the second preferred embodiment of a foldable support frame assembly according to this invention. The second scissor-linkage 2 can be maintained in the unfolded state by the positioning unit 24. In this embodiment, each of the linking rods 21 has a rod body 210 formed with a pivot hole 210' at a middle portion thereof, and a sleeve member 211' sleeved fixedly on an upper end of the rod body 210 and a corresponding end of the corresponding top rail 12. The positioning unit 24 includes a pair of first and second upright plates 240, 241, two parallel abutment rods 242, and two positioning pins 243. The first and second upright plates 240, 241 flank an assembly of the linking rods 21. The first upright plate 240 has a hole 244. The second upright plate 241 has two side holes 245 and a middle hole 246 disposed between the side holes 245 and aligned with the hole 244 in the first upright plate 240. The pivot pin 25 extends through the middle hole 246 in the second upright plate 241, the pivot holes 210' in the linking rods 21, and the hole 244 in the first upright plate 240. Each of the abutment rods 242 is triangular in cross-section, and has one end connected fixedly to the first upright plate 240, and the other end formed with a pinhole 247. The abutment rods 242 are spaced apart from each other along the first direction (A). The positioning pins 243 extend respectively through the side holes 245 in the second upright plate 241, and are inserted respectively into the pinholes 247 in the abutment rods 242. When the second scissor-linkage 2 is in the unfolded state, each of the abutment rods 242 abuts against the linking rods 21 to thereby maintain the second scissor-linkage 2 in the unfolded state.

Figure 11:
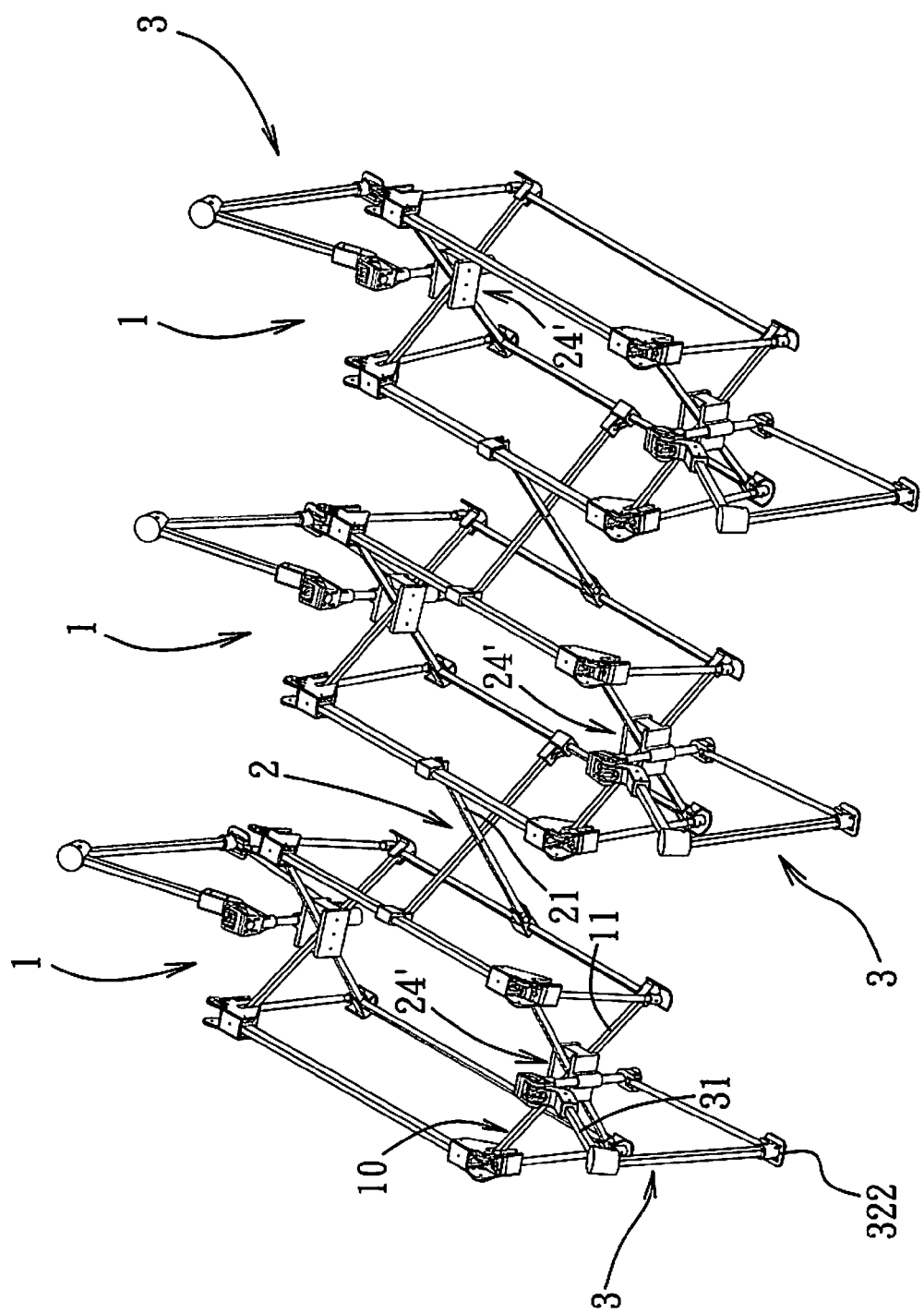
FIG. 11 is a perspective view of the third preferred embodiment of a foldable support frame assembly according to this invention in an unfolded state.
Figure 12:
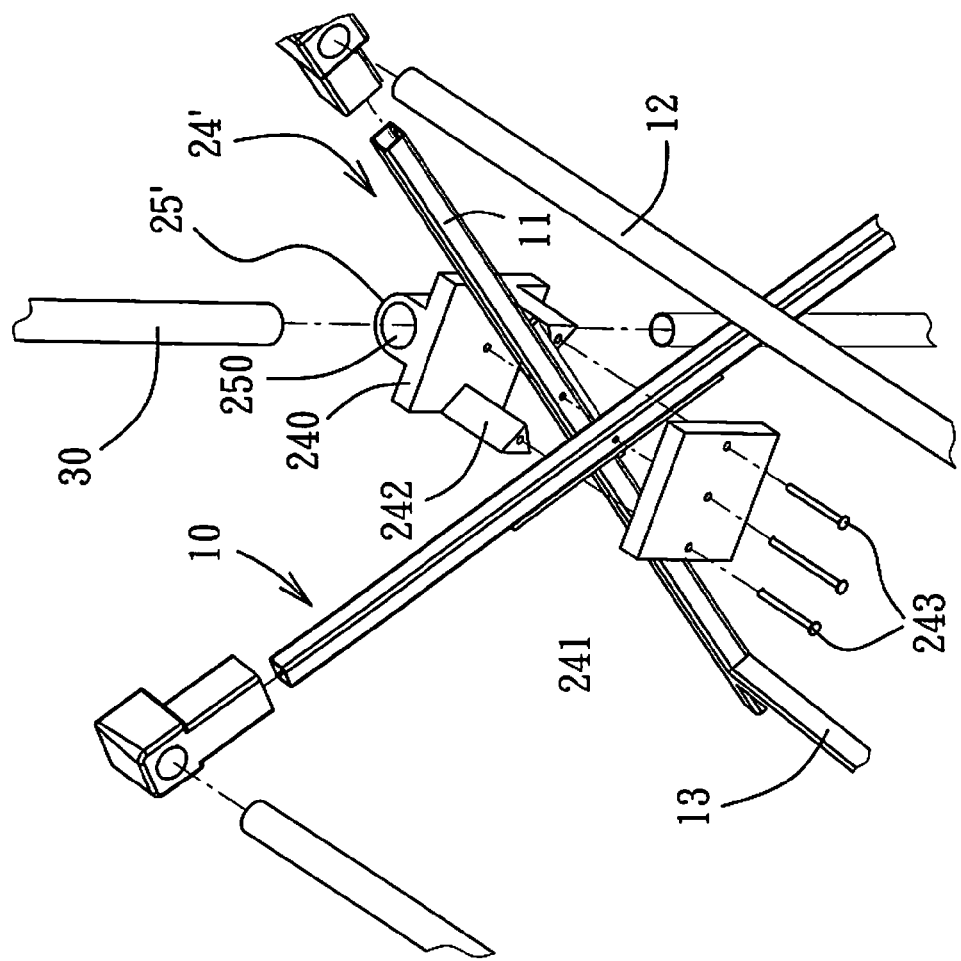
FIG. 12 is an exploded perspective view of a first scissor-linkage and a positioning unit of the third preferred embodiment.
Figure 13:
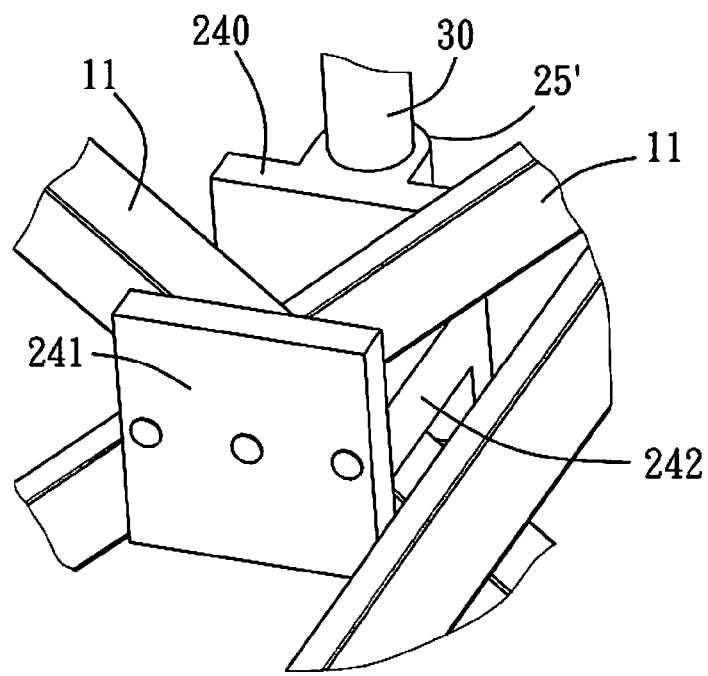
FIG. 13 is an assembly perspective view of the first scissor-linkage and the positioning unit of the third preferred embodiment, illustrating how the first scissor-linkage is in a fully-unfolded state.
Figure 14:
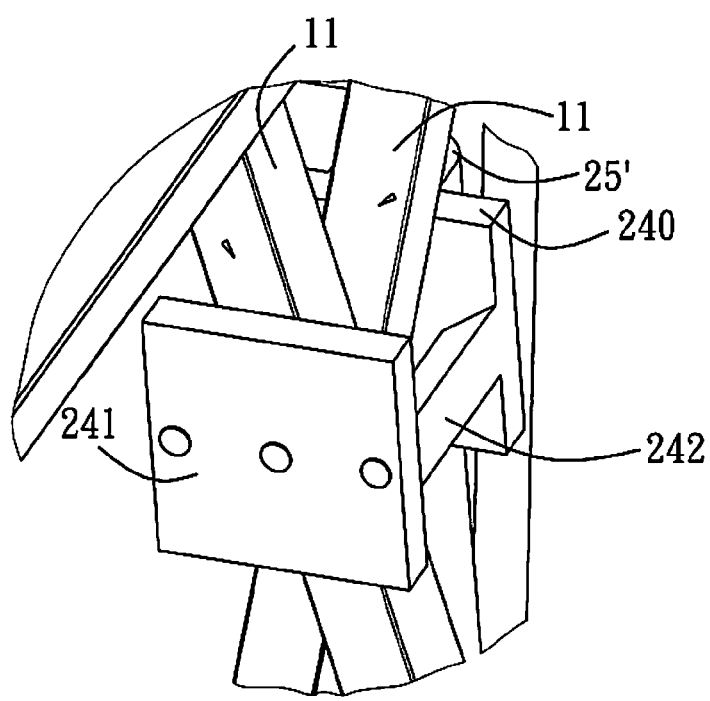
FIG. 14 is a view similar to FIG. 13 but illustrating how the first scissor-linkage is in a semi-unfolded state.

FIG. 11 shows the third preferred embodiment of a foldable support frame according to this invention, which includes three support units 1, two second-linkages 2, six expansion units 3, and six positioning units 24'. Unlike the second preferred embodiment, the positioning units 24' are disposed respectively on the first scissor-linkages. With further reference to FIGS. 12, 13, and 14, similar to the second preferred embodiment, each of the positioning unit 24' includes a pair of first and second upright plates 240, 241, two parallel abutment rods 242, and two positioning pins 243. When the first scissor-linkage is in the unfolded state, the abutment rods 242 abut against the braces 11 to thereby maintain the first scissor-linkage in the unfolded state, as shown in FIG. 13.

Unlike the first preferred embodiment, each of the first upright plates 240 has a projection 25' formed with an upright hole 250 therethrough, and the expansion units 3 are disposed respectively on the first upright plates 240 in such a manner that the telescopic rods 30 extend respectively through the upright holes 250 in the first upright plates 240. In addition, the first links 31 are connected respectively and pivotally to upper ends of the telescopic rods 30.

To speed up the folding and unfolding operation of the foldable support frame assembly, the lower end of each of the braces 1 can be provided with a caster 4 (see FIG. 15) or a curved sliding plate 5 (see FIG. 16).

Figure 17:
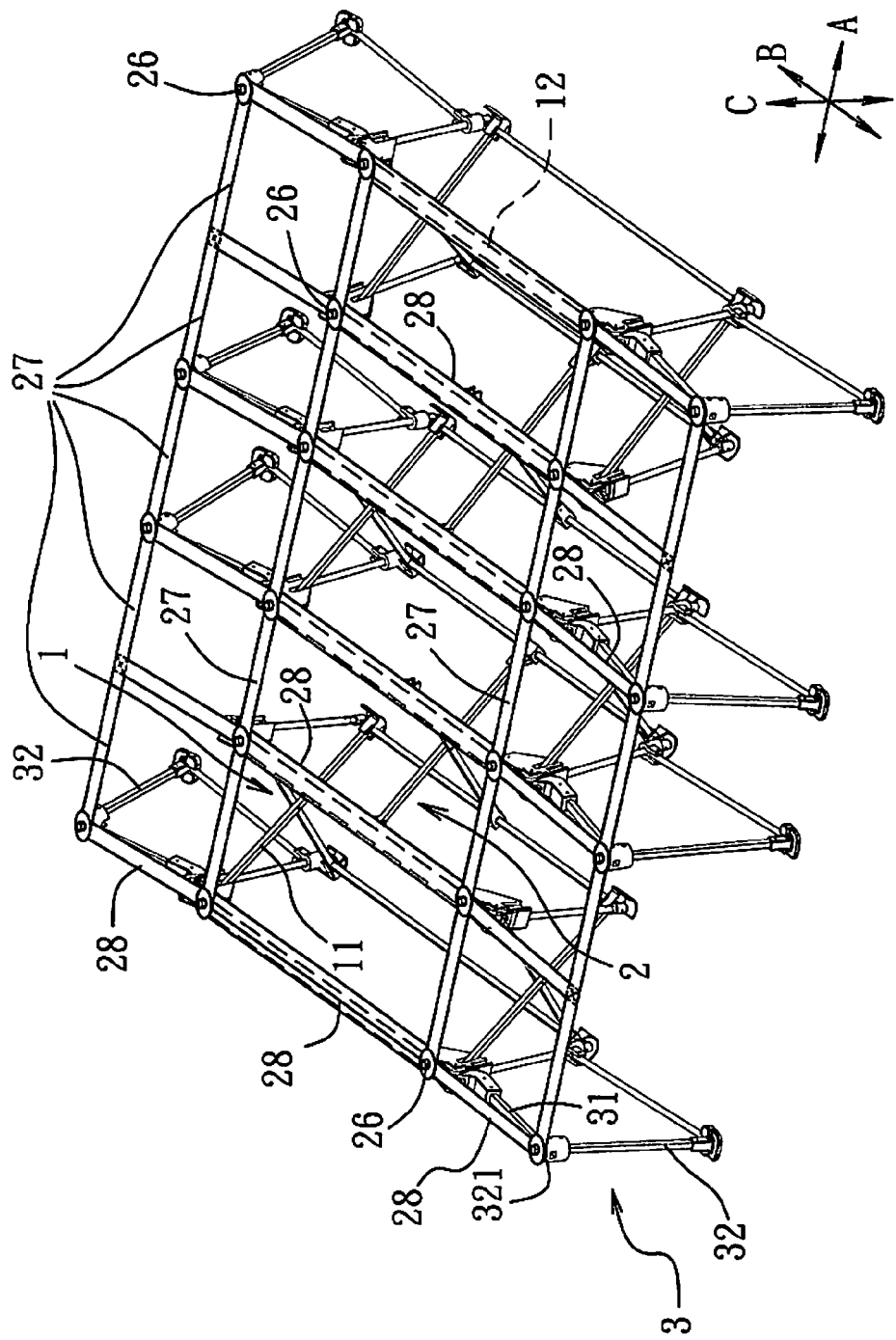
FIG. 17 is a perspective view of the fourth preferred embodiment of a foldable support frame assembly according to this invention in an unfolded state.

FIG. 17 shows the fourth preferred embodiment of a foldable support frame assembly according to this invention, which includes a modified positioning mechanism. The modified positioning mechanism includes a plurality of belt-connecting members 26, a plurality of longitudinal pull belts 27, and a plurality of transverse pull belts 28. The belt-connecting members 26 are disposed respectively on ends of the top rails 12 and the first ends 321 of the second links 32. Any two adjacent ones of the belt-connecting members 26 are interconnected by a corresponding one of the longitudinal pull belts 27 and the transverse pull belts 28. As such, the top rails 12 of each of the support units 1 are interconnected by two longitudinal pull belts 27 constituting a pull belt unit. When each of the first scissor-linkages and the second scissor-linkages 2 is in the unfolded state, each of the longitudinal and transverse pull belts 27, 28 are pulled straight such that each of the longitudinal pull belts 27 extends along the first direction (A) and each of the transverse pull belts 28 extends along the second direction (B). As a result, the foldable support frame assembly can be maintained in the unfolded state.

With this invention thus explained, it is apparent that numerous modifications and variations can be made without departing from the scope and spirit of this invention. It is therefore intended that this invention be limited only as indicated by the appended claims.

We claim:

1. A foldable support frame assembly adapted for supporting an article, said foldable support frame assembly comprising:
    a first and a second support unit arranged along a first direction, each of said support units including two support frames, each of said support frames including two parallel braces and a rail unit connected fixedly between said braces, said braces of one of said support frames of each of said support units being connected respectively and pivotally to said braces of the other of said support frames of a corresponding one of said support units at a point where said connected braces cross to constitute two first scissor-linkages, said two first scissor-linkages being spaced apart from each other along a second direction perpendicular to the first direction, each of said first scissor-linkages being convertible between folded and unfolded states, wherein said rail unit of each of said support frames includes a top rail connected fixedly between upper portions of said braces of a corresponding one of said support frames, and a bottom rail connected fixedly between lower portions of said braces of the corresponding one of said support frames;
    at least one second scissor-linkage arranged alternately with said support units along the first direction, said second scissor-linkage being convertible between folded and unfolded states such that, when each of said first and second scissor-linkages is in the unfolded state, said article can be supported on said support units; and
    a positioning mechanism for maintaining each of said first and second scissor-linkages in the unfolded state.

2. The foldable support frame assembly as claimed in claim 1, wherein said second scissor-linkage includes two linking rods, which are connected pivotally to each other and each of which has an upper end connected pivotally to a corresponding one of said top rails of said support frames of the first of said support units, and a lower end connected pivotally to a corresponding one of said bottom rails of said support frames of the second of said support units.

3. The foldable support frame assembly as claimed in claim 2, wherein said foldable support frame assembly further comprises at least one expansion unit that is disposed on one of said support units and that includes:
    a telescopic rod extending along a third direction perpendicular to the first and second directions and having an upper rod portion connected pivotally to an end of a corresponding one of said top rails of said support frames of the one of said support units, and a lower rod portion connected telescopically to said upper rod portion and connected pivotally to an end of a corresponding one of said bottom rails of said support frames of the one of said support units;
    a sliding member sleeved movably on said telescopic rod;
    a first link having a first end connected pivotally to an upper rod of said telescopic rod, and a second end opposite to said first end of said first link;
    a second link having a first end connected pivotally to said second end of said first link, and a second end opposite to said first end of said second link; and
    a third link having a first end connected pivotally to said second end of said second link, and a second end opposite to said first end of said third link and connected pivotally to said sliding member such that, when each of said first and second scissor-linkages is in the unfolded state, said second end of said second link is movable to a position coplanar with said lower ends of said braces of said support units, and when each of said first and second scissor-linkages is in the folded state, said second end of said first link is pivotable to abut against the corresponding one of said top rails of said support frames of the one of said support units.

4. The foldable support frame assembly as claimed in claim 2, wherein:
    each of said top rails of support frames of said support units includes a top rail body having a circular cross-section, a top mounting block sleeved on said top rail body in a tight fitting manner and having an abutment face abutting against said upper end of a corresponding one of said linking rods of said second scissor-linkage when each of said first and second scissor-linkages is in the unfolded state, two aligned top lugs extending integrally from said top mounting block, and a pivot pin extending through said top lugs and said upper end of the corresponding one of said linking rods of said second scissor-linkage such that said upper end of the corresponding one of said linking rods is disposed between said top lugs; and
    each of said bottom rails of said support frames of said support units includes a bottom rail body having a generally rectangular cross-section, a bottom mounting block sleeved on said bottom rail body in a tight fitting manner and having an abutment face abutting against said lower end of a corresponding one of said linking rods of said second scissor-linkage when each of said first and second scissor-linkages is in the unfolded state, two aligned bottom lugs extending integrally from said bottom mounting block, and a pivot pin extending through said bottom lugs and said lower end of the corresponding one of said linking rods of said second scissor-linkage such that the corresponding one of said linking rods is disposed between said bottom lugs, said abutment faces of said top and bottom mounting blocks of said support frames of said support units constituting said positioning mechanism.

5. The foldable support frame assembly as claimed in claim 4, wherein:
- each of said top mounting blocks includes two halves that are connected removably to each other and that define a circular hole therebetween; and
- each of said bottom mounting blocks includes two halves that are connected removably to each other and that define a rectangular hole therebetween.

6. The foldable support frame assembly as claimed in claim 5, wherein said halves of each of said top and bottom mounting blocks are connected threadedly to each other.

7. The foldable support frame assembly as claimed in claim 2, wherein each of linking rods of said second scissor-linkage is formed with a pivot hole at a middle portion thereof, said second scissor-linkage further including a pivot pin extending through said pivot holes in said linking rods of said second scissor-linkage, said positioning mechanism including a positioning unit disposed on said second scissor-linkage, said positioning unit including:
- a pair of first and second upright plates flanking an assembly of said linking rods of said second scissor-linkage, said first upright plate having a hole, said second upright plate having two side holes and a middle hole disposed between said side holes and aligned with said hole in said first upright plate to permit said pivot pin of said second scissor-linkage to extend through said hole in said first upright plate and said middle hole in said second upright plate;
- two parallel abutment rods each having one end connected fixedly to said first upright plate, and the other end formed with a pinhole, said abutment rods being spaced apart from each other and abutting against said linking rods of said second scissor-linkage when each of said first and second scissor-linkages is in the unfolded state; and
- two positioning pins extending respectively through said side holes in said second upright plates and inserted respectively into said pinholes in said abutment rods.

8. The foldable support frame assembly as claimed in claim 2, wherein each of braces of said first scissor-linkages is formed with a pivot hole at a middle portion thereof, each of said support units further including two pivot pins each extending through said pivot holes in said braces of a respective one of said first scissor-linkages, said positioning mechanism including a plurality of positioning units disposed respectively on said first scissor-linkages, each of said positioning units including:
- a pair of first and second upright plates flanking an assembly of said braces of a corresponding one of said first scissor-linkages, said first upright plate having a hole, said second upright plate having two side holes and a middle hole disposed between said side holes and aligned with said hole in said first upright plate to permit a corresponding one of said pivot pins to extend through said hole in said first upright plate and said middle hole in said second upright plate;
- two parallel abutment rods each having one end connected fixedly to said first upright plate, and the other end formed with a pinhole, said abutment rods being spaced apart from each other and abutting against said braces of the corresponding one of said first scissor-linkages when each of said first and second scissor-linkages is in the unfolded state; and
- two positioning pins extending respectively through said side holes in said second upright plates and inserted respectively into said pinholes in said abutment rods.

9. The foldable support frame assembly as claimed in claim 8, further comprising at least one expansion unit that is disposed on one of said first upright plates of said positioning units, the one of said first upright plates of said positioning units being formed with an upright hole therethrough, said expansion unit including:
- a telescopic rod extending through said upright hole in one of said first upright plates of said positioning units along a third direction perpendicular to the first and second directions and having an upper rod portion and a lower rod portion connected telescopically to said upper rod portion;
- a sliding member sleeved movably on said telescopic rod;
- a first link having a first end connected pivotally to an upper rod of said telescopic rod, and a second end opposite to said first end of said first link;
- a second link having a first end connected pivotally to said second end of said first link, and a second end opposite to said first end of said second link; and
- a third link having a first end connected pivotally to said second end of said second link, and a second end opposite to said first end of said third link and connected pivotally to said sliding member such that, when each of said first and second scissor-linkages is in the unfolded state, said second end of said second link is movable to a position coplanar with said lower ends of said braces of said support units.

10. The foldable support frame assembly as claimed in claim 1, wherein each of said braces of said support frames of said support units is provided with a caster at a lower end thereof.

11. The foldable support frame assembly as claimed in claim 1, wherein each of said braces of said support frames of said support units is provided with a curved sliding plate at a lower end thereof.

12. The foldable support frame assembly as claimed in claim 1, wherein said positioning mechanism includes a plurality of pull belt units connected respectively to said support units, each of said pull belt units including at least one pull belt having two ends fastened respectively to said top rails of a corresponding one of said support units, said pull belts being pulled straight and extending along the first direction when each of said first and second scissor-linkages is in the unfolded state.

* * * * *